United States Patent [19]

Stauffer

[11] 4,016,003

[45] Apr. 5, 1977

[54] BENEFICIATION OF METAL SCRAP

[75] Inventor: William O. Stauffer, Moraga, Calif.

[73] Assignee: Kaiser Aluminum & Chemical Corporation, Oakland, Calif.

[22] Filed: Jan. 23, 1976

[21] Appl. No.: 651,999

[52] U.S. Cl. .................................. 134/19; 134/5; 134/105; 202/100; 202/238; 203/40

[51] Int. Cl.² ........................................ B08B 7/00

[58] Field of Search .................. 134/5, 19, 105; 202/100, 238; 203/40

[56] References Cited

UNITED STATES PATENTS

| 1,416,865 | 5/1922 | Patch | 134/19 X |
|---|---|---|---|
| 2,925,821 | 2/1960 | MacDonald | 134/105 X |

Primary Examiner—Arthur D. Kellogg
Attorney, Agent, or Firm—Paul E. Calrow; John S. Rhoades

[57] ABSTRACT

This invention relates to a method and apparatus for beneficiating relatively small shredded scrap metal particles, such as aluminum metal particles preparatory to remelting the same, by passing the particles through a beneficiating chamber that is heated to a substantially uniform elevated metal temperature throughout and while passing the particles through such chamber effecting a vaporization of the non-aluminum volatiles, such as coatings, paints and lacquers that adhere to said particles and while avoiding ignition of the said volatiles.

17 Claims, 5 Drawing Figures

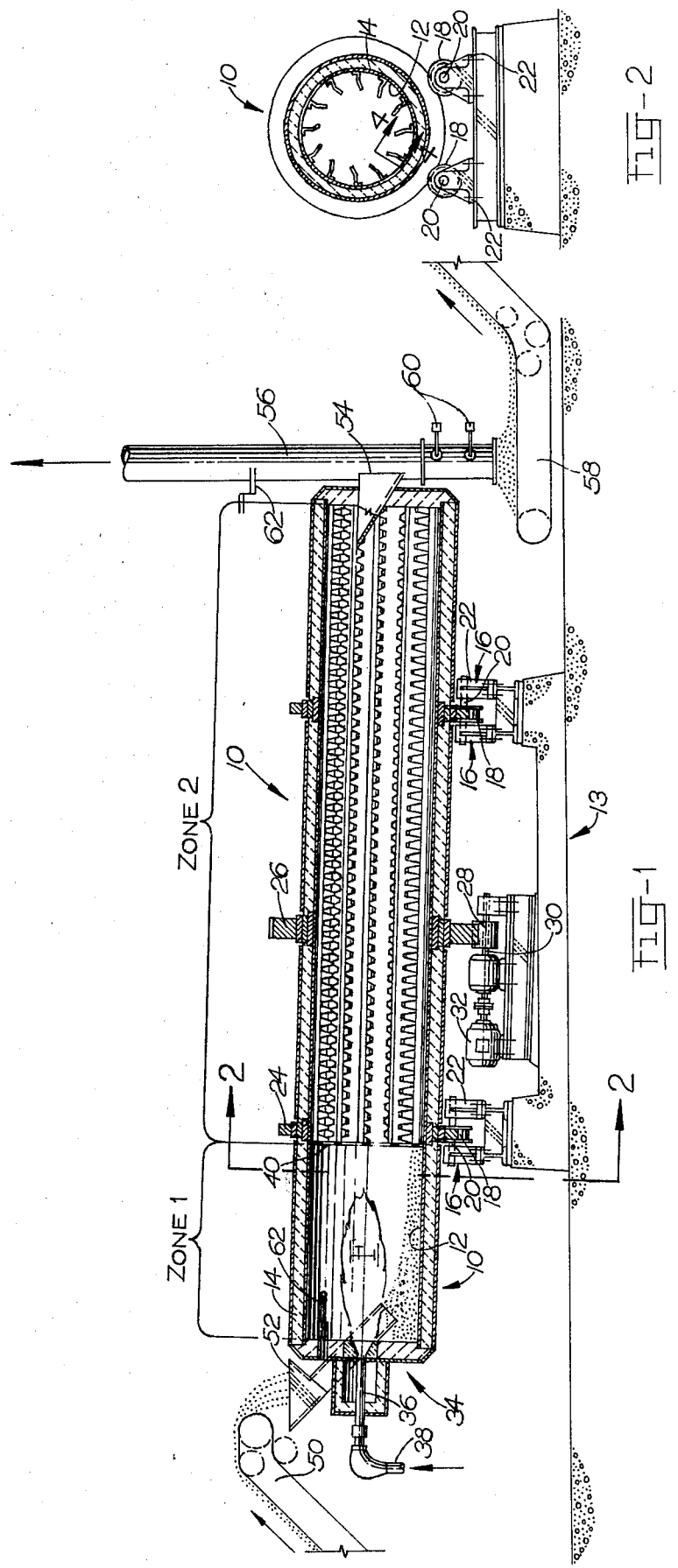

BENEFICIATION OF METAL SCRAP

BACKGROUND OF THE INVENTION

This invention relates to the beneficiation of shredded metal scrap material. More particularly, it is concerned with the beneficiation of shredded aluminous scrap materials, such as those scrap materials resulting from the production, use and recycling of aluminum can bodies and ends preparatory to remelting the same in a metallurgical furnace.

As part of this scrap recycling process, aluminum can bodies and ends, after being collected, are cleaned, crushed and then shredded into small irregular fragments that normally range in particle size from about 1 to 1½ inches. Prior to being remelted, these shredded aluminum particles are desirably first beneficiated, i.e., subjected to selected elevated temperatures to drive off the volatiles, such as the paints, lacquers and coatings that cover the particles. This beneficiation of the scrap materials by heating is effected primarily by vaporization of the volatiles associated with the scrap materials and the avoidance of ignition and burning of the volatiles inasmuch as ignition and burning of the volatiles can lead, among other things, to the ultimate burning and oxidizing of the metal rather than its beneficiation and recovery.

The avoidance of burning is important for another reason in that the conventional materials from which most or many of the aluminum can bodies and ends are presently made generally comprise aluminum alloy materials designated as a 3004 alloy by the Aluminum Association for the can bodies and 5182 and 5082 aluminum alloys for the can ends. The aluminum ends are normally double seamed to the can bodies and remain connected to the can bodies from the time the can bodies are filled with a beverage or beer, etc. and seamed until they are ultimately fully recycled and melted down. The 5000 series aluminum alloys contain magnesium as a major alloying ingredient while magnesium is present to some extent in the aforementioned 3000 series aluminum alloy. During heating and beneficiation of the scrap metal can ends and bodies containing magnesium, the possibilities of burning of the scrap can be aggravated due to the presence of the magnesium. When burning occurs a substantial amount of otherwise recoverable aluminum metal can become oxidized and lost. All of these factors detract from the desired maximum recovery of the aluminum metal material and the overall results of the recycling process.

The above-noted problems involved in the beneficiation of shredded aluminum scrap to obtain the maximum recovery of the aluminum for remelt purposes have not been satisfactorily solved by use of the procedures and equipment presently normally available for recovering and beneficiating scrap metal and the like, such as those represented, for example, by U.S. Pat. No. 1,869,886; 2,977,255; 3,116,545; 3,346,417; 3,322,529; 3,598,649; 3,650,830; 3,817,697; 3,821,026; 3,839,086 and Canadian Pat. No. 944,568.

SUMMARY OF THE INVENTION

The instant invention is concerned with an improved process and apparatus for beneficiating shredded aluminous metal scrap particles including those aluminum alloy particles which contain a certain amount of magnesium or other readily combustible alloying ingredients and/or are wholly or partly covered with volatile materials, such as coatings, paints and lacquers. In the operation of the beneficiation process, the shredded scrap material which is passed through a suitable beneficiating roaster or roaster-like device to be described, and comprised of two scrap handling zones, contains on the order of about 94–96% scrap metal material and on the other of from 4–6% readily volatilizable materials. The process and equipment of the instant invention are advantageously designed to accomplish approximately a 90% or better recovery of the metal as a result of the beneficiation. The two main scrap handling and heating zones of the roaster-type device comprise a minor or a material loading zone and an adjoining major or tumbling zone. The roaster-type device is controllably fired whereby a uniform material temperature on the order of 700° F. and air temperatures of between 650° F. and 750° F. are maintained throughout the adjoining and intercommunicating zones. Careful maintenance of these temperatures helps to avoid ignition of the volatile materials in both zones.

When the slowly rotating roaster-type device is fully loaded with the shredded materials to be recovered and beneficiated, the material loading can amount to approximately 10% of the cross section of the roaster. In order to maintain the desired beneficiation conditions where the materials that are volatilizable are heated to a volatizing temperature without being raised to the ignition temperature, the main burner flame is introduced at the material entry or loading end of the roaster device in such a fashion that the flame will be concurrent rather than countercurrent to the flow of the shredded material through the roaster.

Elongated material lifter elements that can be of an improved toothed design are advantageously located a selected distance downstream from the material loading and flame entry end of the roaster device. These lifters which make up the tumbling zone or major portion of the roaster preferably extend for approximately two-thirds to four-fifths of the length of the roaster device while at the same time being located somewhat remote from the material and flame entry end of the roaster device by a distance preferably on the order of one-third to one-fifth of the length of the roaster device. While the roaster device burner can be gas or oil fired, it is adjusted so that its flame will desirably project only a relatively short distance, e.g. one-fifth to one-third of the length of the roaster device into the entry end thereof whereby the flame terminates short of and preferably does not penetrate into the material lifter or tumbling zone. The practice of the instant invention also contemplates situations where the burner and its flame can be located outside of and adjacent the entry end of the roaster whereby only the products of combustion from the burner flame need pass through the material entry end of the roaster and into the roaster zones per se for heating up and vaporizing the volatiles still clinging to the shredded scrap material after the initial processing of the scrap.

The aforesaid dispositions of and adjustments of the burner and its flame are all helpful in avoiding direct flame and material contact that can result in ignition rather than vaporization of the volatiles contained in the scrap material being treated. The initiation and continuance of agitation and tumbling of the shredded scrap somewhat downstream from the flame of the roaster or roaster-like device advantageously obviate the production of fines in the flame area and this further minimizes ignition and burning of the scrap material in the roaster.

A preferred embodiment of the invention contemplates that the lifters which are radially mounted within the tumbling zone of the roaster device have a somewhat broken saw toothed design. As the roaster is slowly rotated, these toothed lifters produce a repeated tumbling and cascading of the various irregularly shaped particles during passage of the same through the roaster device. During the tumbling and cascading of the individual shredded metal scrap particles substantially all of the coated surfaces of the scrap particles ultimately become exposed to the controlled elevated temperatures of the roaster device. As a consequence substantially all of the volatiles clinging to the shredded scrap particles finally become vaporized and separated from the particles without being ignited as these particles are heated to and maintained at a substantially uniform temperature of about 700° F. during a residence period within the roaster device on the order of between 15–30 minutes.

BRIEF DESCRIPTION OF THE DRAWINGS

FIG. 1 is a side elevational view partly in section of a typical roaster-type device that can be used to practice the concepts of the instant invention;

FIG. 2 is a cross-sectional view generally taken along line 2—2 of FIG. 1 with parts removed;

DETAILED DESCRIPTION

Figure 3:
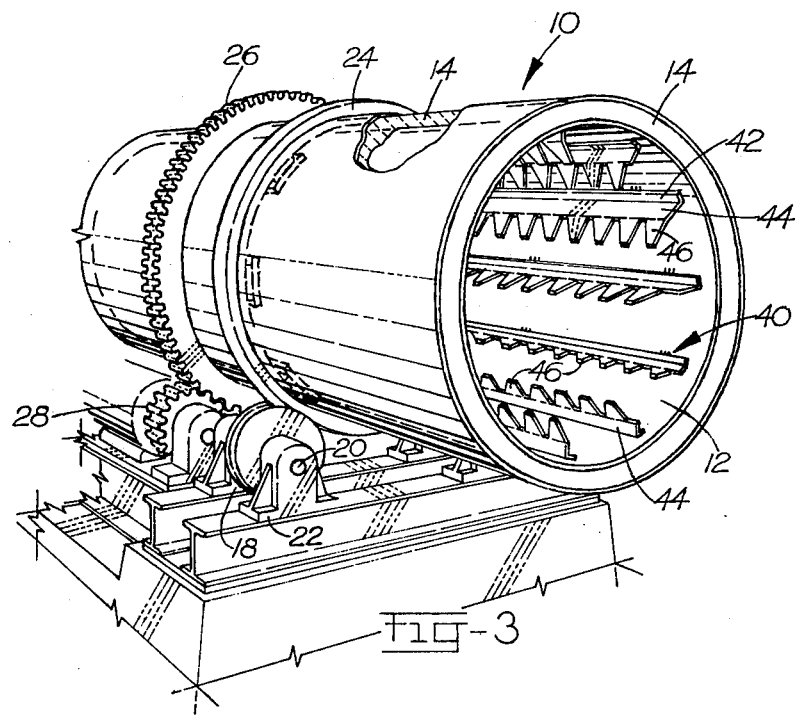
FIG. 3 is a partly broken perspective view of the exit or discharge device of FIG. 1 with parts removed.
Figures 4, 5:
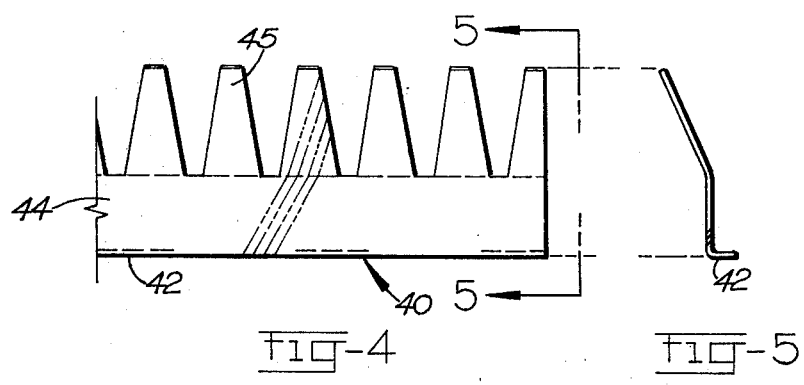
FIG. 4 is a view generally taken along line 4—4 of FIG. 2 with parts removed.
FIG. 5 is a view generally taken along line 5—5 of FIG. 4.

With further reference to the drawings, it will be observed that the improved shredded metal beneficiating process can be practiced by the use of a suitable roaster-like device such as the roaster device 10 illustrated, for example, in FIGS. 1 through 3 of the drawings. Roaster device 10 is generally comprised of a roller mounted tubular shell 12 made of a suitable grade of steel and inclined at an appropriate angle to a supporting base 13. Attached to and surrounding shell 12 is jacket 14 of appropriate insulating material secured to the exterior of shell 12. Roaster device 10 is rotatably supported on a series of standard roller assemblies 16 made up of rollers 18 mounted on shafts 20 that are journaled in the journal bearings 22. The rollers 18 are adapted to contact and interfit with the usual metal tires 28 that surround the roaster device in the manner of a belt.

Roaster device 10 is driven or rotated at appropriate slow speeds by means of the ring-type gear 26 attached to and surrounding an intermediate part of the roaster device. Ring gear 26 is engaged and driven by a pinion gear 28 mounted on a shaft 30 ultimately driven by the reversible motor assembly 32.

Located at the material entry end 34 of the roaster device 10 is a standard oil or gas fired burner 36 supplied by fuel line 38. Burner 36 is advantageously adjusted to project a flame F inwardly of the roaster device entry end 34 for a distance on the order of between one-fifth and one-third of the entire length of the roaster and as indicated in FIG. 1, short of the one terminal end portion of the elongated lifter devices 40.

As indicated particularly in FIGS. 2 and 3, rows of lifter devices, such as the elongated lifter devices 40, are radially disposed and secured to the inner surface of the tubular steel shell of the roaster device 10. In one form of the invention these lifters can have a broken saw tooth design and be somewhat Z-shaped in cross section, whereby they are provided with a short leg 42 that is bolted or welded directly to the steel sheel, a web portion 44 located at about a 90° angle to the short leg 42 and a toothed portion 46. The toothed portion is disposed at approximately a 45° angle to the web portion 44 and the width of the toothed portion or the length of a tapered toothed element 45 can approximate 6 inches while the width of the web can be about 4 inches. Each tapered toothed element may be approximately 1 inch at its shortest width of topmost edge and 3 inches at its base or greatest width. This design of the toothed flights provides for a relatively even distribution of the shredded scrap particles across the tumbling zone, optimizes their exposure to heat and helps produce a repeated tumbling and cascading of the individual shredded aluminous metal particles as the particles course or pass from the entry to the exit end of the roaster device. The teeth 45 in one lifter 40 can also be advantageously offset relative to the teeth in an adjacent lifter 40.

The shredded material is fed to the roaster-type device 10 by a standard endless conveyor 50 and conventional entry chute 52 that dumps the material off to one side and below the flame F to avoid direct flame and material contact. The fully beneficiated material is discharged from the closed exhaust end of device 10 by means of a standard centrally disposed exit chute 54 which leads to and opens into a double gated exhaust pipe or stack 56. The top of pipe 56 can be connected to a suitable exhaust system. The double gated exhaust pipe 56 permits the shredded and beneficiated scrap material to be discharged periodically upon the endless conveyor device 58 through the medium of the two damper-type valve mechanisms 60. These valve mechanisms can be automatically controlled by a suitable timer mechanism (not shown) whereby when one is opened the other is closed. This will allow the effluent materials comprised of the vaporized volatiles and products of combustion to pass up the exhaust stack 56 substantially continuously while the beneficated scrap is progressively fed to conveyor 68 by the successive opening of the two valves 60. The beneficiated scrap material when removed from the roaster and passed on to the conveyor 58 can be advantageously subsequently transferred to a standard remelt furnace. Suitable thermocouples 62 are appropriately mounted in the forward end wall of the roaster device and in the stack 56 for controlling the operation of the burner 36 in a well-known manner in order that the overall material temperature will be maintained at approximately a uniform 700° F. during full passage of the material through the slowly rotating roaster while the air temperature within the roaster may vary somewhat from between 650° F. at the front or material entry end to 750° F. at the exit end.

The structure and disposition of the lifters 40 relative to the burner 36 and the use of a short well-mixed flame help to produce a proper vaporization of the volatiles. As noted, burning of the shredded aluminum material is minimized by avoidance of direct contact between the shredded aluminum and burner flame particularly upon movement of the material into the roaster device 10 and the provision of material and flame concurrent flow.

By locating the lifting toothed elements downstream somewhat from the entry end of the roaster as noted, a stirring up of the heated shreds and the release of more combustibles are avoided at the entry end and generally confined to the tumbling and material agitation zone. The shallow 45° angle between toothed elements 45 and web 44 in lifter 40 is sufficient to produce the proper capture, retention and distribution of the scrap material across the tumbling zone. It has been found that a roaster device of the type described and having a shell that is about 5 feet in diameter, a length of about 30 feet and equipped with 12 evenly radially disposed lifter flights 40 when rotated on the order of about 3 RPM satisfactorily processed and beneficiated 3500 lbs. of shredded aluminum scrap material per hour.

An advantageous embodiment of the invention has been shown and described. Various changes may be made therein without departing from the spirit and scope thereof as defined in the appended claims wherein:

What is claimed is:

1. An apparatus for use in beneficiating relatively small shredded aluminous metal particles or the like covered with volatilizable materials comprising the combination of a somewhat inclined and rotatable roaster-type device, means for rotating said roaster-type device at selected speeds, said roaster-type device being provided with a metal particle entry end and a metal particle exit end, flame means for selectively heating said roaster-type device at the metal particle entry end thereof, means for introducing the metal particles into the said metal particle entry end of the roaster-type device and off to the one side of and below said flame means so as to avoid direct flame and particle contact, a plurality of rows of toothed flight elements radially mounted within said roaster-type device, said flight elements commencing a selected distance downstream from the material entry end of the roaster-type device and extending along the length of the roaster-type device for a major portion of the said length, said flight elements being adapted to contact and effect a separation of the metal particles one from another as well as a distribution of the metal particles cross-wise of the device and tumbling and cascading movements of the metal particles initially at points remote from the said metal particles entry end during passage of the metal particles through the roaster-type device so as to effect substantially full exposure of the volatile covered surfaces of the metal particles to the heat of the roaster-type device but without direct flame and particle contact, and means for recovering the beneficiated metal particles at the exit end of the roaster-type device.

2. The apparatus as set forth in claim 1 wherein at least one flight element comprises an elongated and angularly shaped metal section having cut-away portions defining teeth elements.

3. The apparatus as set forth in claim 2 wherein portions of said metal section defining the teeth elements are disposed at a relatively shallow angle to the adjoining portion of the metal section.

4. The apparatus as set forth in claim 2 wherein the one flight element has a broken saw tooth configuration.

5. The apparatus as set forth in claim 1 wherein the teeth of one flight element are offset relative to the teeth in an adjacent flight element.

6. The apparatus as set forth in claim 1 wherein one extremity of a flight element terminates adjacent the particle exit end of the roaster-type device and the other extremity of the said flight element terminates at a point located downstream from the entry end of the roaster-type device by a distance on the order of about one-fifth to one-third the length of the device.

7. The apparatus of claim 1, including means for introducing the metal particles into the bottom of the roaster-type device at the entry end thereof.

8. An apparatus for use in beneficiating relatively small shredded aluminous metal particles or the like covered with volatilizable materials comprising the combination of a somewhat inclined and rotatable roaster-type device, means for rotating said roaster-type device at selected speeds, said roaster-type device being provided with a metal particle entry end and a metal particle exit end, flame means for selectively heating said roaster-type device at the metal particle entry end thereof, means for introducing the metal particles into the said metal particle entry end of the roaster-type device and off to one side of and below said flame means so as to avoid direct flame and particle contact, a plurality of rows of toothed flight elements radially mounted within said roaster-type device, said flight elements commencing a selected distance downstream from the material entry end of the roaster-type device and extending along the length of the roaster-type device for a major portion of the said length, said flight elements being adapted to contact and effect a separation of the metal particles one from another as well as a distribution of the metal particles cross-wise of the device and tumbling and cascading movements of the metal particles initially at points remote from the said metal particle entry and during passage of the metal particles through the roaster-type device so as to effect substantially full exposure of the volatile covered surfaces of the metal particles to the heat of the roaster-type device, but without direct flame and particle contact and means for recovering the beneficiated metal particles at the exit end of the roaster-type device, said metal particles at the exit end of the roaster-type device, said metal particle recovery means including a double-acting gate means located adjacent the exit end of the roaster-type device for transferring the beneficiated metal particles to a further particle handling means.

9. The apparatus of claim 1, wherein the flight elements terminate adjacent the exit end of the roaster-type device.

10. A process for beneficiating shredded aluminum scrap metal particles of irregular shapes the exposed surfaces of certain of which are at least partly covered with volatilizable materials, comprising the steps of introducing said particles into the bottom area of a heated particle receiving zone while avoiding direct contact between the heat producing medium utilized to heat the said zone and the scrap metal particles, allowing said particles to flow freely downward into an adjoining and second heated zone located in open communication with said first zone and while distributing said particles substantially evenly across various portions of said second zone causing the particles to pass through said second zone in the form of cascading streams of repeatedly tumbled particles so as to effect maximum exposure of substantially all outer surfaces of the particles covered with volatilizable materials to the heat of the said zones and a volatilization of the volatilizable materials clinging thereto and during passage of the particles throughout all of the said zones maintaining the elevated temperatures of said zones below the ignition point of the volatilizable materials.

11. The process of claim 10, including the step of maintaining the metal temperature of the zones at a substantially uniform temperature on the order of about 700° F.

12. The process of claim 11, including the step of maintaining the air temperature of the zones on the order of between 650° and 750° F.

13. The process of claim 10, including the step of avoiding direct contact between a flame and the metal particles during full passage of the particles through the said zones.

14. The process of claim 10 including the step of introducing a flame a selected distance within the first zone and above the metal particles and effecting a concurrent flow of metal particles and the flame heating said zones.

15. The process of claim 10 including the step of introducing only the products of combustion of a flame into the first zone.

16. The process of claim 10 including the step of collecting and separating the volatilizable materials and products of combustion from the beneficiated metal particles.

17. The process of claim 10 including the step of shredding the metal particles to a particle size of between 1 to 1½ inches prior to introduction of the same into the said zones.

* * * * *

UNITED STATES PATENT OFFICE
CERTIFICATE OF CORRECTION

PATENT NO. : 4,016,003
DATED : April 5, 1977
INVENTOR(S) : William O. Stauffer

It is certified that error appears in the above-identified patent and that said Letters Patent are hereby corrected as shown below:

Column 2, line 8, "other" should be --order--

Column 3, line 53, "28" should be --24--

Column 6, lines 44-46, "metal particles at the exit end of
  the roaster-type device, said metal particles
  at the exit end of the roaster-type device,
  said metal particle recovery means includ-"
  should be --device, said metal particle
  recovery means includ---

Signed and Sealed this

*twenty-third* Day of August 1977

[SEAL]

Attest:

RUTH C. MASON
*Attesting Officer*

C. MARSHALL DANN
*Commissioner of Patents and Trademarks*